United States Patent
Walton, III

(10) Patent No.: US 10,313,261 B1
(45) Date of Patent: Jun. 4, 2019

(54) TENANT ASSIGNMENT SYSTEM

(71) Applicant: Workday, Inc., Pleasanton, CA (US)

(72) Inventor: Harry Philip Walton, III, Dublin, CA (US)

(73) Assignee: Workday, Inc., Pleasanton, CA (US)

( * ) Notice: Subject to any disclaimer, the term of this patent is extended or adjusted under 35 U.S.C. 154(b) by 109 days.

(21) Appl. No.: 15/183,668

(22) Filed: Jun. 15, 2016

(51) Int. Cl.
| | |
|---|---|
| G06F 15/16 | (2006.01) |
| H04L 12/911 | (2013.01) |
| H04L 29/08 | (2006.01) |
| H04L 12/24 | (2006.01) |
| G06F 9/50 | (2006.01) |

(52) U.S. Cl.
CPC .............. *H04L 47/70* (2013.01); *H04L 41/24* (2013.01); *H04L 41/5038* (2013.01); *H04L 67/10* (2013.01); *G06F 9/5027* (2013.01)

(58) Field of Classification Search
CPC ..... G06F 9/5027; G06F 9/45533; H04L 67/10
See application file for complete search history.

(56) References Cited

U.S. PATENT DOCUMENTS

| | | | | |
|---|---|---|---|---|
| 6,345,316 B1* | 2/2002 | Chessell | ................. | G06F 9/466 709/201 |
| 9,507,612 B1* | 11/2016 | Henry | ..................... | G06F 9/452 |
| 9,652,129 B1* | 5/2017 | Caballero | ............... | H04L 65/60 |
| 9,754,303 B1* | 9/2017 | Jagtap | ................. | G06Q 30/0631 |
| 9,779,015 B1* | 10/2017 | Oikarinen | ............... | G06F 12/02 |
| 9,871,745 B2* | 1/2018 | Steinder | ................ | H04L 47/783 |
| 2013/0019015 A1* | 1/2013 | Devarakonda | ........ | G06F 9/5072 709/226 |
| 2013/0212064 A1* | 8/2013 | Mahmoud | ......... | G06F 17/30306 707/609 |
| 2013/0247044 A1* | 9/2013 | Bingham | ............ | G06F 9/45533 718/1 |
| 2013/0290598 A1* | 10/2013 | Fiske | .................... | G06F 3/0625 711/103 |
| 2014/0075016 A1* | 3/2014 | Chatterjee | ........... | H04L 41/5041 709/224 |
| 2016/0134558 A1* | 5/2016 | Steinder | ................ | H04L 47/783 709/226 |
| 2017/0111446 A1* | 4/2017 | Rivera | ................ | H04L 67/1008 |
| 2017/0222910 A1* | 8/2017 | Cai | .................... | H04L 43/0888 |

* cited by examiner

*Primary Examiner* — Hieu T Hoang
(74) *Attorney, Agent, or Firm* — Van Pelt, Yi & James LLP

(57) ABSTRACT

A system for tenant assignment includes an interface and a processor. The interface is to receive a tenant resource usage data and a hardware resource data. The tenant resource usage data comprises a tenant information on a set of tenants. The hardware resource data comprises a hardware resource information on a set of hardware resources. The processor is to develop a tenant assignment model based at least in part on the tenant resource usage data and the hardware resource data, solve the tenant assignment model to determine a suggested tenant assignment comprising an assignment of the set of tenants to the set of hardware resources, and to provide the suggested tenant assignment.

18 Claims, 11 Drawing Sheets

TENANT ASSIGNMENT SYSTEM

BACKGROUND OF THE INVENTION

In the cloud computing paradigm, companies deliver computing resources, including both hardware and software, as a service over networks. Companies must carefully manage hardware resources to meet service level agreements while keeping costs low. Maintaining under-utilized hardware resources is costly.

BRIEF DESCRIPTION OF THE DRAWINGS

Various embodiments of the invention are disclosed in the following detailed description and the accompanying drawings.

DETAILED DESCRIPTION

Figure 1:
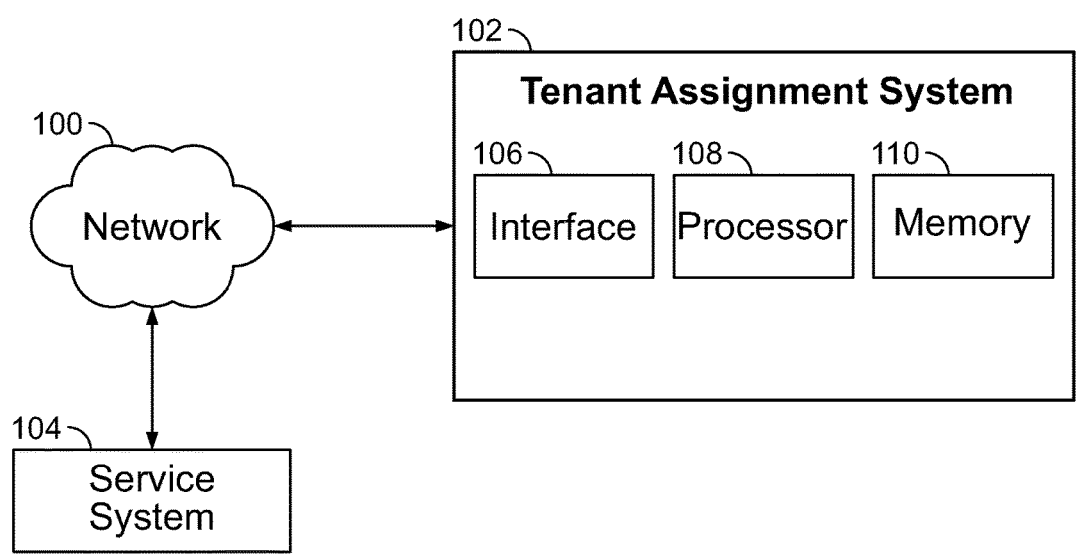
FIG. 1 is a block diagram illustrating an embodiment of a system for tenant assignment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for tenant assignment is disclosed. The system comprises an interface to receive a tenant resource usage data and a hardware resource data. The tenant resource usage data comprises a tenant information on a set of tenants, and the hardware resource data comprises a hardware resource information on a set of hardware resources. The system further comprises a processor to develop a tenant assignment model based at least in part on the tenant resource usage data and the hardware resource data, solve the tenant assignment model to determine a suggested tenant assignment comprising an assignment of the set of tenants to the set of hardware resources, and provide the suggested tenant assignment.

In some embodiments, a company provides a software to a customer. For example, the company provides software that is centrally hosted on hardware connected using a network (e.g., the internet). In some embodiments, tenants are allocated to hardware resources in a manner that leaves hardware resources partially utilized. Improving the efficiency of fulfilling tenant requirements impacts the cost of providing the software. Providing the software to a customer may comprise providing one or more services. A service may comprise a specific functionality provided by a specialized server. Maintaining many hardware resources that are partially utilized is more expensive than maintaining a smaller number of hardware resources that are fully utilized. In some embodiments, tenants are initially allocated in a chronological manner. In some embodiments, tenants are initially allocated in a suggested fashion (e.g., striving for an optimal or efficient allocation), but the allocation becomes inefficient due to a growth or decrease in tenant computer processor usage or tenant computer memory usage. For example, a customer company significantly increases its employee count and requires more computer memory to store data for its employees. In various embodiments, a tenant comprises a production tenant, an implementation tenant, a sandbox tenant, a preview tenant, or any other appropriate tenant. In some embodiments, a customer has multiple tenants. In some embodiments, a system for tenant assignment analyzes tenant resource usage data and hardware resource data, develops a usage model, and solves the model for a suggested tenant assignment. In some embodiments, the processor further assigns the set of tenants based at least in part on the suggested tenant assignment. In some embodiments, the suggested tenant assignment consolidates tenants to a smaller number of hardware resources, freeing up other hardware resources. In some embodiments, newly freed hardware resources are used for new tenants or kept empty for use in case they are needed for overflows or other overuse situations where the allocation is not able to handle the demands on hardware resources. In various embodiments, the suggested tenant assignment accounts for constraints such as a volatile tenant that must be isolated, tenants that cannot be grouped together, a processor limit, a memory limit, a specialized service required by a tenant, a hardware resource configuration, or any other appropriate constraint. In some embodiments, in the event where there are two equivalent suggested assignments (e.g., the cost of the suggested allocations are equivalent or roughly equivalent—for example, within a percent or two of overall costing), the system selects one of the suggested allocations randomly. In various embodiments, the system assigns the tenant assignment based on an order of calculation, a user choice, a pseudo random process, a rank order process, or any other appropriate assignment selection.

FIG. 1 is a block diagram illustrating an embodiment of a system for tenant assignment. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Tenant assignment system 102 and service system 104 communicate via network 100. In the example shown, tenant assignment system 102 comprises interface 106, processor 108, and memory 110. In some embodiments, tenant assignment system 102 comprises a system for assigning tenants to service system 104. In some embodiments, service system information comprises tenant resource usage data or hardware resource data. In some embodiments, service system information is sent from service system 104 to tenant assignment system 102 via network 100. In some embodiments, service system information comprises an information on a computer processor usage, a computer memory usage, a service allocation, an inefficiency, or a tenant allocation. In some embodiments, tenant assignment system 102 or service system 104 is used by a software-as-a-service company. In some embodiments, tenant assignment system 102 or service system 104 are part of a human resources system. In various embodiments, service system 104 is used by a human resources system to provide a production code, a preview code, an implementation code, or a sandbox code to a customer. In various embodiments, the production code comprises a product, the preview code allows customers to preview new features of the product, the implementation code allows the customer to test features of the product, the sandbox code allows a product provider to test new features, or the system uses code in any other appropriate functionality.

Figure 2A:
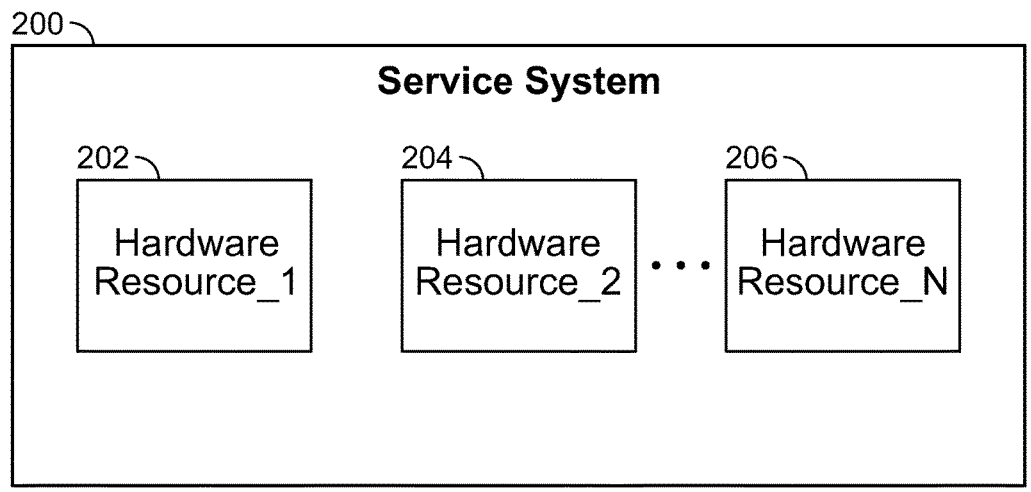
FIG. 2A is a block diagram illustrating an embodiment of a service system.

FIG. 2A is a block diagram illustrating an embodiment of a service system. In some embodiments, service system 200 is used to implement service system 104 of FIG. 1. In the example shown, service system 200 comprises hardware resource_1 202, hardware resource_2 204, and hardware resource_N 206. In some embodiments, service system 200 comprises 1, 5, 27, or any appropriate number of hardware resources. In some embodiments, service system 200 hosts a service provided to a customer. In some embodiments, the service is provided using software that the customer accesses over the internet. In some embodiments, service system 200 comprises hardware resources that are configured to provide various services.

Figure 2B:
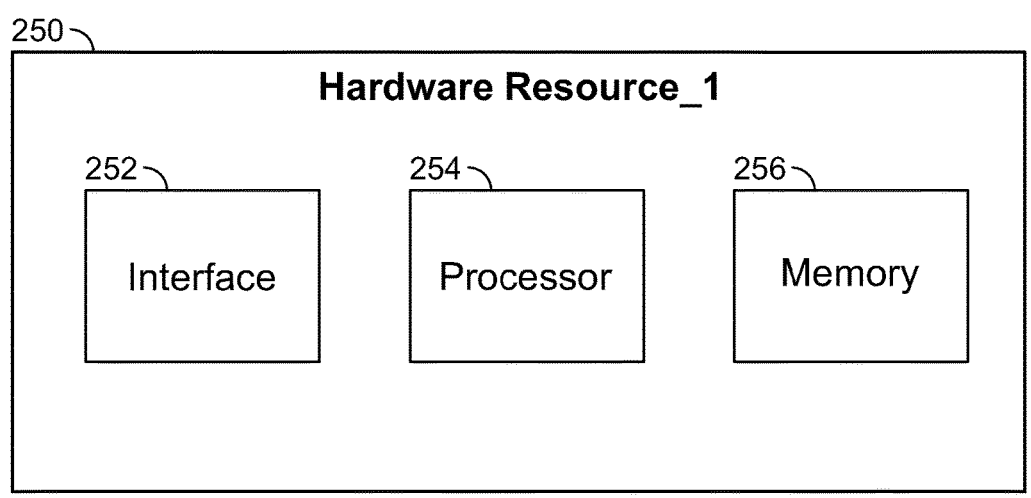
FIG. 2B is a block diagram illustrating an embodiment of a hardware resource.

FIG. 2B is a block diagram illustrating an embodiment of a hardware resource. In some embodiments, hardware resource_1 250 is used to implement hardware resource_1 202, hardware resource_2 204, or hardware resource_N 206 of FIG. 2A. In the example shown, hardware resource_1 250 comprises interface 252, processor 254, and memory 256. In some embodiments, interface 252, processor 254, and memory 256 manage tenant specific data. In some embodiments, interface 252 allows hardware resource_1 250 to communicate with a customer system corresponding to the tenant. For example, a user of the customer system enters a payroll information into a webpage, and the information is transferred to interface 252 over a network. In some embodiments, processor 254 executes a process or analysis on data received via the interface. For example, the payroll information is processed to produce a payroll result. In some embodiments, memory 256 stores tenant data. For example, the payroll result is stored. In some embodiments, hardware resource_1 250 services multiple tenants.

Figure 3A:
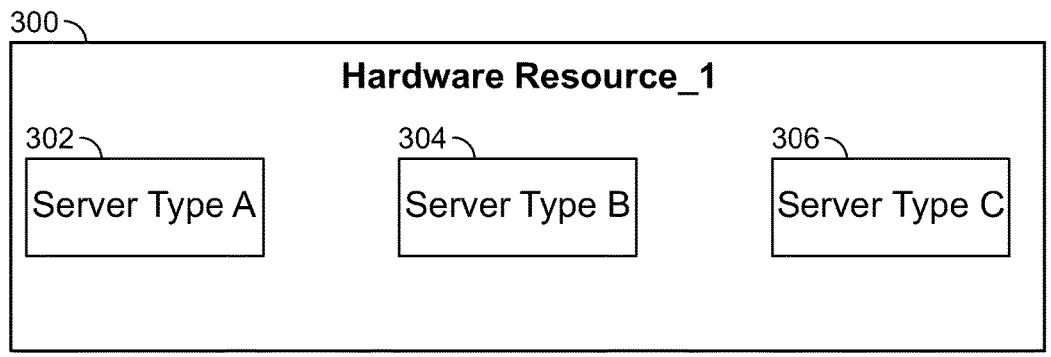
FIG. 3A is a block diagram illustrating an embodiment of a hardware resource.

FIG. 3A is a block diagram illustrating an embodiment of a hardware resource. In some embodiments, hardware resource_1 202 of FIG. 2A is implemented using hardware resource_1 300. In the example shown, hardware resource_1 300 is configured to comprise server type A 302, server type B 304, and server type C 306. In some embodiments, server type A 302, server type B 304, and server type C 306 are three different types of specialized servers. In some embodiments, a hardware resource is configured to comprise one or more specialized servers. In some embodiments, a specialized server comprises an object server that is run on a Java™ virtual machine (JVM). In various embodiments, a hardware resource comprises one or more JVMs, or a JVM comprises one or more object servers. In some embodiments, a specialized server provides a service. In some embodiments, a hardware resource is configured to provide one or more of the following services: an Object Transaction Service (OTS), an Advanced Objects Data Store Service (AOD), an Object Reporting Service (ORS), an object management service, or any other appropriate service.

In some embodiments, a tenant group comprises tenants assigned to the same group of services. In various embodiments, the system for tenant allocation takes into account the configuration of the set of hardware resources, the services a hardware resource provides, the services a tenant requires, or any other appropriate configuration requirement or constraint. In some embodiments, a hardware resource comprises one object transaction server, one advanced objects data store server, any number of object reporting servers, or any other appropriate server.

Figure 3B:
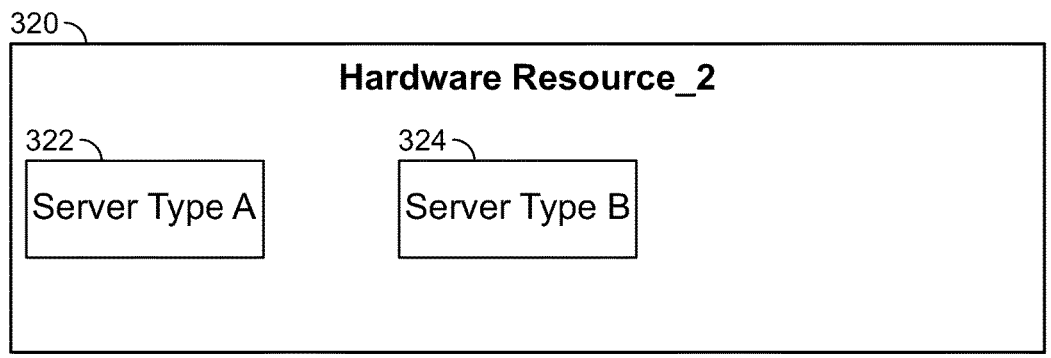
FIG. 3B is a block diagram illustrating an embodiment of a hardware resource.

FIG. 3B is a block diagram illustrating an embodiment of a hardware resource. In some embodiments, hardware resource_2 204 of FIG. 2A is implemented using hardware resource_2 320. In the example shown, hardware resource_2 320 is configured to comprise server type A 322 and server type B 324. In some embodiments, server type A 322 and server type B 324 are two differently configured specialized servers. In some embodiments, server type A 322 provides an Object Transaction Service and server type B 324 provides an Advanced Objects Data Store Service.

Figure 3C:
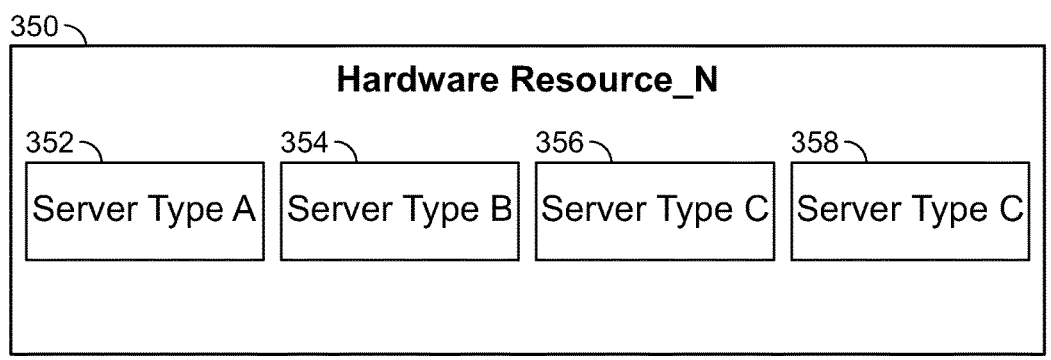
FIG. 3C is a block diagram illustrating an embodiment of a hardware resource.

FIG. 3C is a block diagram illustrating an embodiment of a hardware resource. In some embodiments, hardware resource_N 206 of FIG. 2A is implemented using hardware resource_N 350. In the example shown, hardware resource_N 350 is configured to comprise server type A 352, server type B 354, server type C 356, and server type C 358. In some embodiments, server type A 352, server type B 354, and server type C 356 are differently configured specialized servers. In some embodiments, server type A 352 provides an Object Transaction Service (OTS), server type B 354 provides an Advanced Objects Data Store Service (AOD). In some embodiments, server type C 356 and server type C 358 provide an Object Reporting Service (ORS).

Figure 4:
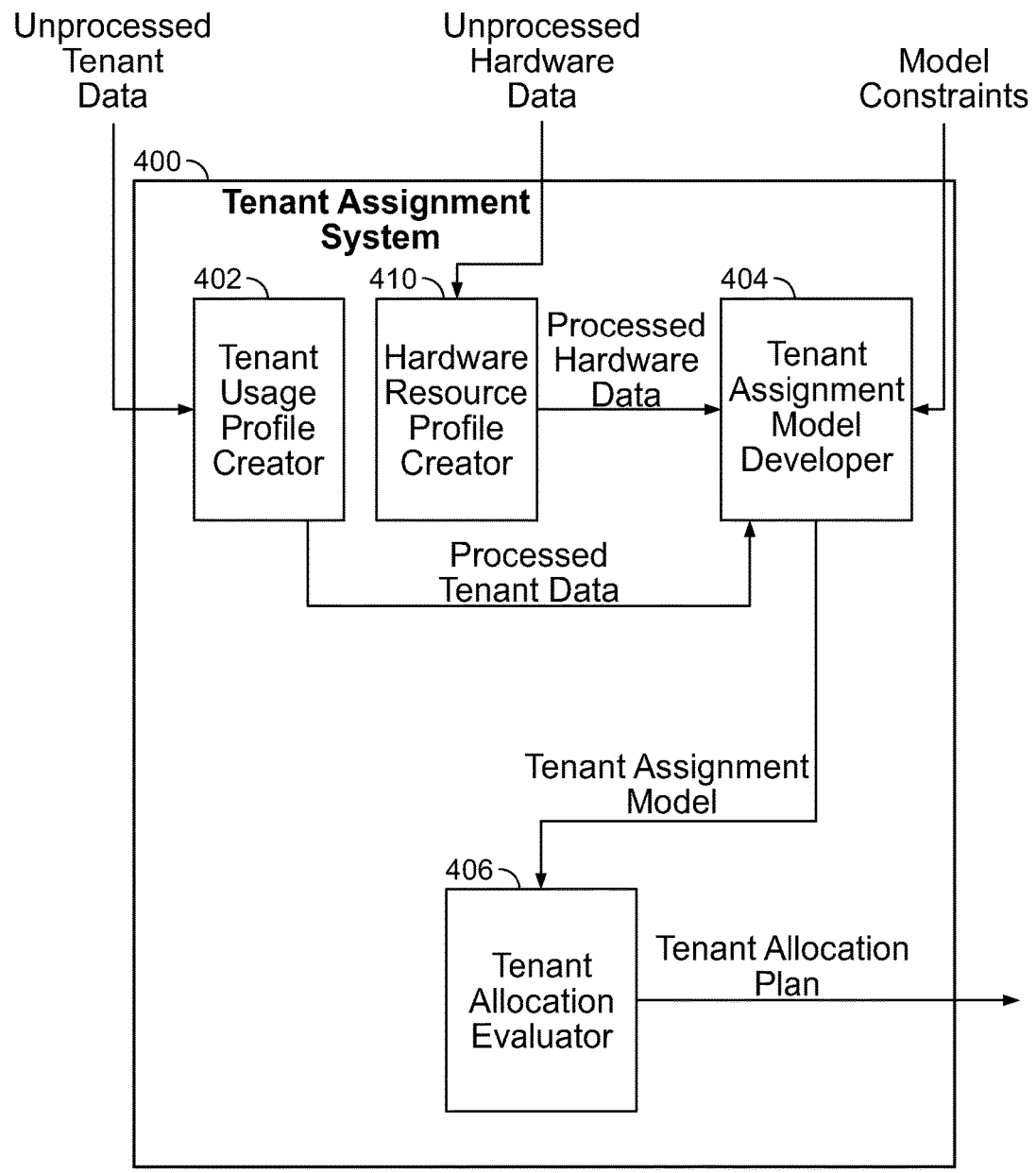
FIG. 4 is a block diagram illustrating an embodiment of a tenant assignment system.

FIG. 4 is a block diagram illustrating an embodiment of a tenant assignment system. In some embodiments, tenant assignment system 102 is implemented using tenant assignment system 400. In the example shown, tenant assignment system 400 comprises tenant usage profile creator 402, hardware resource profile creator 410, tenant assignment model developer 404, and tenant allocation evaluator 406.

In the example shown, tenant usage profile creator 402 receives unprocessed tenant data. In some embodiments, the unprocessed tenant data is received from a service system. In some embodiments, the unprocessed tenant data comprises tenant resource usage data. In some embodiments, tenant usage profile creator 402 consolidates or analyzes the unprocessed tenant data to create a tenant usage profile for a tenant. In some embodiments, the tenant usage profile is based at least in part on one or more of the following: a static data footprint of the tenant data, a metadata size, an estimate of random-access memory (RAM) growth based on the tasks run, a task count, an instance accessed, or a number of decompressions. In various embodiments, the unprocessed tenant data comprises a static RAM use, a dynamic RAM use, a central processing unit (CPU) read count, a CPU write count, a date, a time, a service task type (e.g., OTS, ORS, or AOD), a measure of growth over time, or a tenant identification. In some embodiments, a tenant usage profile is created for all tenants in the set of tenants. In some embodiments, the tenant usage profile comprises a maximum tenant usage case for a time period. In some embodiments, the maximum tenant usage case is used to predict tenant behavior. In the example shown, a processed tenant data is provided to tenant assignment model developer 404. In some embodiments, the processed tenant data comprises the tenant profile or the maximum tenant usage case.

In some embodiments, hardware resource profile creator 410 creates a hardware resource profile for a hardware resource. In some embodiments, the hardware resource profile comprises a server memory capacity and a server processor capacity. In some embodiments, hardware resource profile creator 410 produces a hardware resource profile for a hardware resource based on unprocessed hardware data. In some embodiments, hardware resource profile creator 410 consolidates the information for a hardware resource. In the example shown, hardware resource profile creator 410 receives unprocessed hardware data. In some embodiments, the unprocessed hardware data is received from a service system. In some embodiments, the unprocessed hardware data comprises information on a sizing of a specialized server. In some embodiments, the unprocessed hardware data comprises a measure of JVM RAM or CPU consumed by the specialized server. In some embodiments, the specialized server comprises an object server providing an OTS, ORS, or AOD service. In various embodiments, a hardware configuration, a JVM setting, a JVM role, a JVM size, or a number of cores is used by the hardware resource profile creator. In some embodiments, a service type is mapped to a RAM usage. In some embodiments, the hardware resource profile creator uses Java™ to process the unprocessed hardware data. In the example shown, a processed hardware data is provided to tenant assignment model developer 404. In some embodiments, the processed hardware data comprises a hardware resource profile.

In the example shown, tenant assignment model developer 404 receives model constraints, processed hardware data, and processed tenant data. In various embodiments, the model constraints are provided by a customer or an administrator. For example, an administrator may plan for an upcoming new client by designating a model constraint stating a certain number of servers must be freed. In some embodiments, the tenant assignment model developer 404 consolidates the information into a cost function. The cost function may arrange the model constraints and components into a set of expressions that are evaluated to find an optimal solution with respect to that cost function. In some embodiments, the model is developed to keep the configuration of the hardware resources constant while changing only the tenant organization when there is a cost to changing tenant assignments. In some embodiments, the cost function focuses primarily on saving hardware and secondarily on making fewest changes. In some embodiments, the cost function focuses on avoiding tenant performance degradation while ignoring hardware costs. Changing the configuration of the hardware resources may require downtime of the hardware resources and cause a loss of productivity or cause a delay to clients.

In the example shown, tenant assignment model developer 404 provides a tenant assignment model to tenant allocation evaluator 406. In some embodiments, tenant allocation evaluator 406 evaluates the cost function developed by tenant assignment model developer 404. In some embodiments, tenant allocation evaluator 406 comprises a math library that solves the model. In some embodiments, tenant allocation evaluator 406 processes the model results and determines tenant allocation in configured OTS, AOD, or ORS object servers. Processing the model results may comprise disassembling or interpreting the results of an integer linear program. In the example shown, tenant allocation evaluator 406 provides the tenant allocation plan. In some embodiments, the tenant allocation plan is used to allocate tenants in a service system.

Figure 5A:
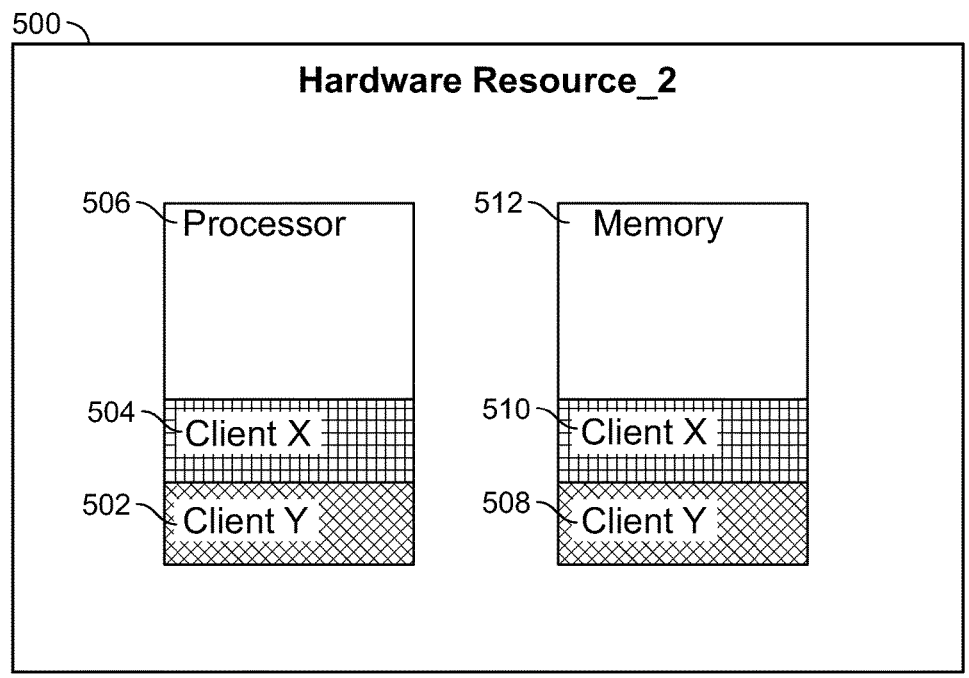
FIG. 5A is a block diagram illustrating an embodiment of a hardware resource before tenant assignment.

FIG. 5A is a block diagram illustrating an embodiment of a hardware resource before tenant assignment. In some embodiments, hardware resource_2 320 of FIG. 3B is implemented using hardware resource_2 500. In the example shown, hardware resource_2 500 comprises processor 506 and memory 512. In the example shown, a client X and a client Y utilize processor 506 and memory 512. In the example shown, portion 504 is the usage or capacity of processor 506 associated with client X. Portion 502 is the usage or capacity of processor 506 associated with client Y. Portion 510 is the usage or capacity of memory 512 associated with client X. Portion 508 is the usage or capacity of memory 512 associated with client Y. In some embodiments, client X and client Y are tenants that have processor capacity and memory capacity requirements. In some embodiments, processor and memory are used to provide client X and client Y with services. In the example shown, processor 506 and memory 512 are not fully utilized.

Figure 5B:
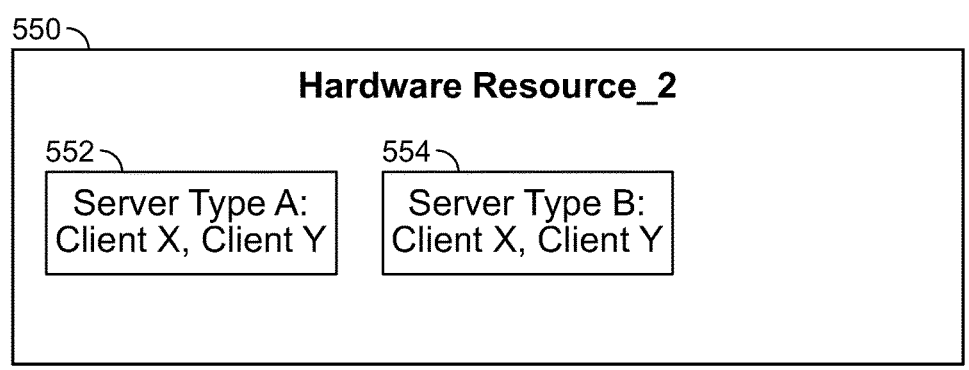
FIG. 5B is a block diagram illustrating an embodiment of a hardware resource before tenant assignment.

FIG. 5B is a block diagram illustrating an embodiment of a hardware resource before tenant assignment. In some embodiments, hardware resource_2 320 of FIG. 3B is implemented using hardware resource_2 550. In the example shown, hardware resource_2 550 comprises server type A 552 and server type B 554. In the example shown, server type A 552 services client X and client Y. In the example shown, server type B 554 services client X and client Y. In some embodiments, hardware resource_2 550 is configured to provide two services via two specialized servers. In some embodiments, hardware resource_2 550 comprises multi-tenanted servers that serve tenant client X and tenant client Y.

Figure 6A:
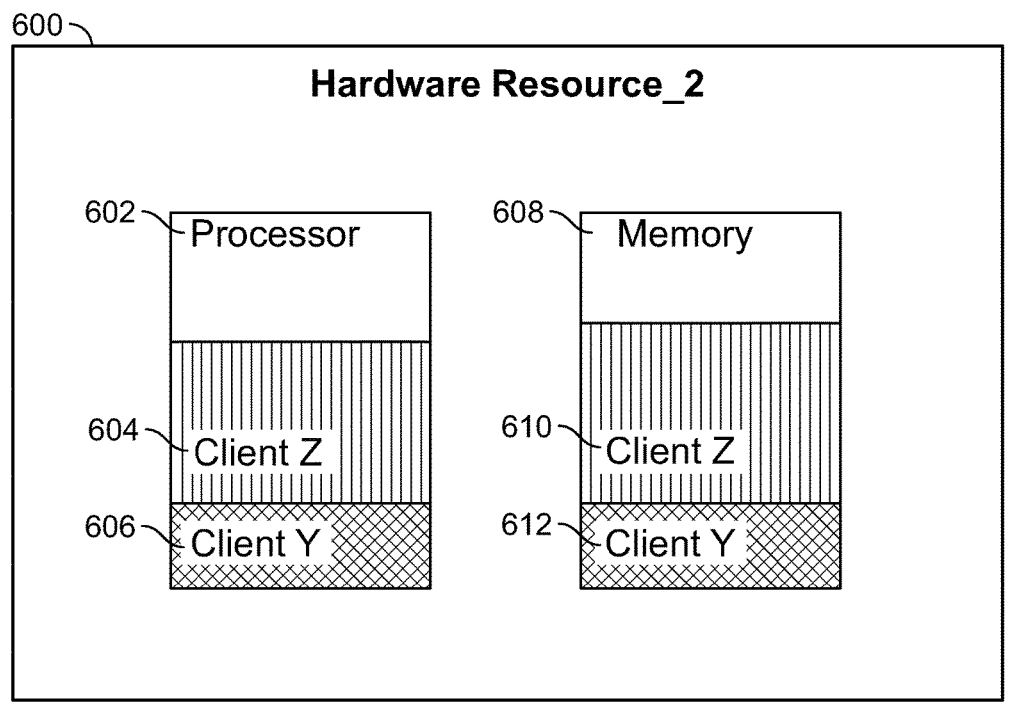
FIG. 6A is a block diagram illustrating an embodiment of a hardware resource after tenant assignment.

FIG. 6A is a block diagram illustrating an embodiment of a hardware resource after tenant assignment. In some embodiments, hardware resource_2 600 is implemented by hardware resource_2 320 of FIG. 3B. In some embodiments, hardware resource_2 600 is implemented by hardware resource_2 500 of FIG. 5A, following a tenant assignment. In the example shown, hardware resource_2 600 comprises processor 602 and memory 608. In the example shown, portion 604 is the usage or capacity of processor 602 associated with client Z. Portion 606 is the usage or capacity of processor 602 associated with client Y. Portion 610 is the usage or capacity of memory 608 associated with client Z. Portion 612 is the usage or capacity of memory 608 associated with client Y. In some embodiments, the system for tenant assignment determined that client Z replace client X of FIG. 5A. In the example shown, client Z requires a greater processor and memory capacity than client X. In some embodiments, utilization of hardware is increased due to the replacement of client X with client Z. In some embodiments, client X is assigned to a different hardware resource, and all services provided to tenant client X, client Y, and client Z are maintained. In some embodiments, client X, client Y, or client Z are customers that have one or more tenants that are serviced.

Figure 6B:
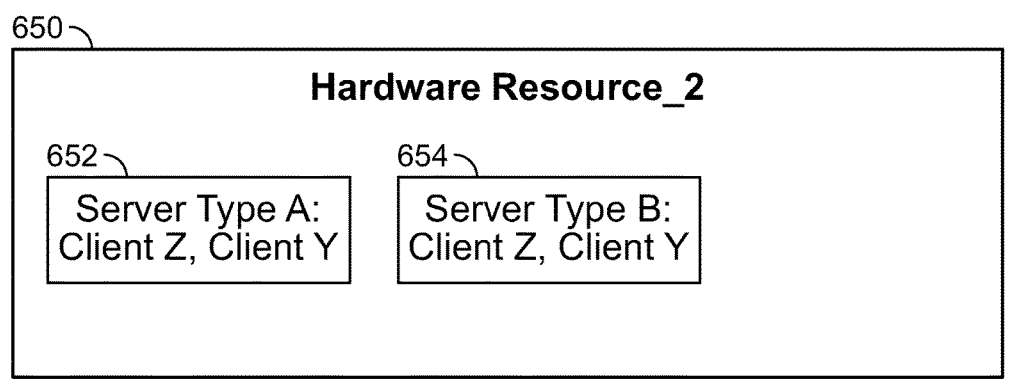
FIG. 6B is a block diagram illustrating an embodiment of a hardware resource after tenant assignment.

FIG. 6B is a block diagram illustrating an embodiment of a hardware resource after tenant assignment. In some embodiments, hardware resource_2 650 is implemented by hardware resource_2 320 of FIG. 3B. In some embodiments, hardware resource_2 650 is implemented by hardware resource_2 550 of FIG. 5B, following a tenant assignment. In the example shown, hardware resource_2 650 comprises server type A 652 and server type B 654. In the example shown, server type A 652 services client Z and client Y. In the example shown, server type B 654 services client Z and client Y. In some embodiments, a server services one tenant.

Figure 7:
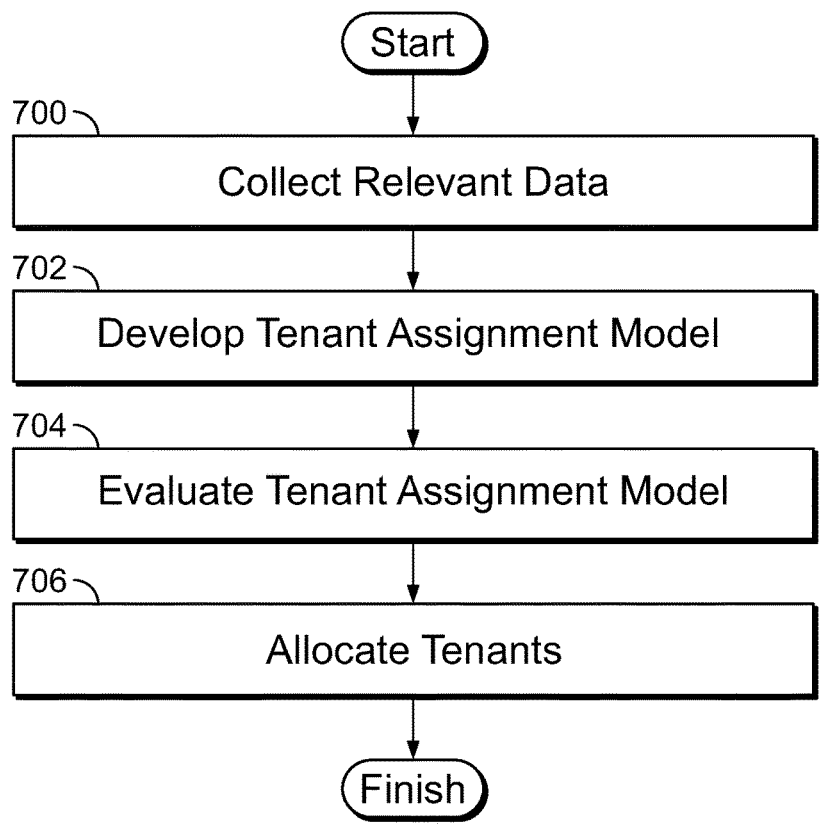
FIG. 7 is a flow diagram illustrating an embodiment of a process for tenant assignment.

FIG. 7 is a flow diagram illustrating an embodiment of a process for tenant assignment. In some embodiments, the process of FIG. 7 is executed using tenant assignment system 400 of FIG. 4. In some embodiments, the process for tenant assignment is triggered by a user, administrator, or any appropriate entity that desires to update the tenant assignment to a suggested allocation based on recent data. In some embodiments, the process for tenant assignment is part of scheduled maintenance on the service system. In the example shown, in 700, relevant data is collected. In some embodiments, relevant data is processed to create profiles. In some embodiments, relevant data comprises information on tenant usage of hardware or information on a hardware configuration. In 702, a tenant assignment model is developed. In some embodiments, the tenant assignment model comprises a constraint. In 704, a tenant assignment model is evaluated. In 706, tenants are allocated. In some embodiments, the suggested tenant assignment allocates a tenant to a hardware resource to target a more optimal allocation of resources.

Figure 8:
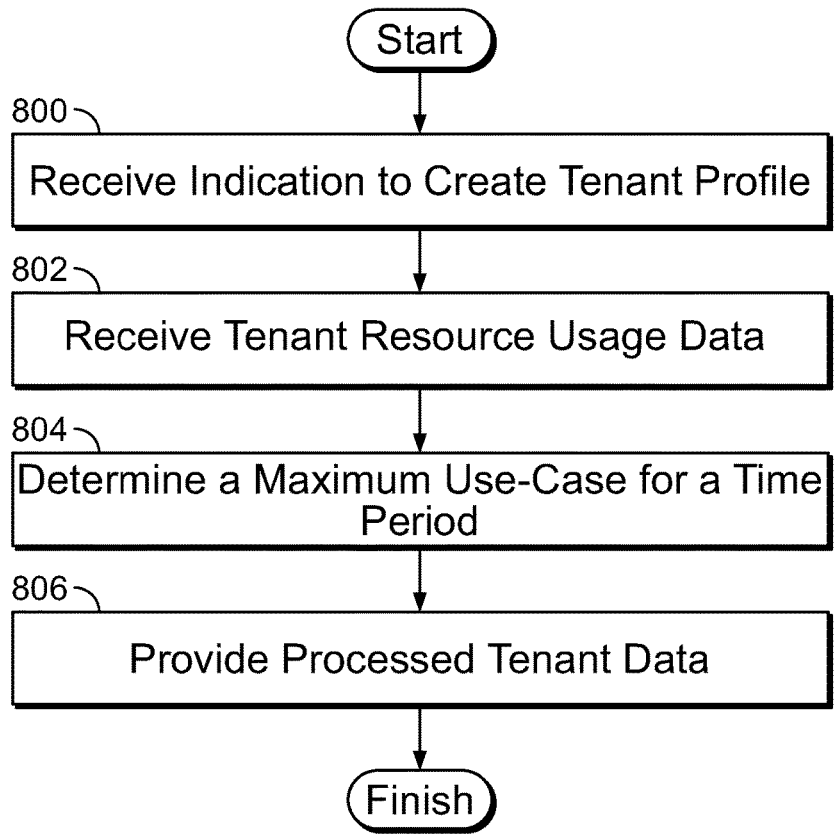
FIG. 8 is a flow diagram illustrating an embodiment of a tenant usage profile creator process.

FIG. 8 is a flow diagram illustrating an embodiment of a tenant usage profile creator process. In some embodiments, the process of FIG. 8 is executed using tenant usage profile creator 402 of FIG. 4. In the example shown, in 800, an indication to create a tenant profile is received. In some embodiments, the indication to create a tenant profile is triggered when the process for tenant assignment has been triggered.

In 802, tenant resource usage data is received. In some embodiments, the data is collected using Datameer® or a cloud service. In some embodiments, tenant resource usage data comprises reports from a shared company site, for example a report posted using Atlassian Confluence®. In various embodiments, one or more of the following comprise tenant resource usage data: a tenant memory summary, a memory compression statistic, a server task statistic, a JVM parameter, or an access log. In some embodiments, the tenant resource usage data comprises one or more of the following: a task log, a garbage collection (GC) log, or a tenant configuration data. In some embodiments, a tenant has a required service, wherein the required service comprises one of the following: an OTS, an AOD, or an ORS. In various embodiments, the required service comprises one or more of the following: storing data, transforming data, deleting data, performing calculations, providing data, or any other appropriate service. In some embodiments, together, the OTS, ORS, and AOD services provide the execution of the business logic of the software. For example, if a tenant performs a business process (e.g., the process of hiring an employee) all data transformation services are provided within the OTS, ORS, and AOD services. In some embodiments, tenant resource usage data comprises the service(s) required by a tenant. In some embodiments, the data is preprocessed. In some embodiments, the data is formatted into files and a curl operation is performed on the data. In some embodiments, the data is preprocessed using Java™.

In some embodiments, tenant resource usage data comprises information on a full garbage collection event. In some embodiments, a full garbage collection event occurs when the memory capacity hits a threshold. In some embodiments, a full garbage collection event occurs when the memory utilized is dangerously high and needs to be cleared. In some embodiments, a full garbage collection event causes a delay or inconvenience to a user being serviced by the hardware. In some embodiments, a tenant assignment model aims to eliminate full garbage collections or limit the number of full garbage collections that happen in a time period. In some embodiments, tenant resource usage data comprises a timing or a size of a full garbage collection.

In some embodiments, tenant resource usage data comprises a hardware resource element use by service type based on a time or day of week. For example, a static RAM use by service type (e.g., OTS, ORS, AOD, etc.) and by day of week is recorded. In some embodiments, a dynamic RAM use by task type and time is recorded. For example, a JVM providing an ORS service generally grows when a serviced customer performs a write task. In some embodiments, tenant resource usage data comprises task counts and types such as CPU reads or CPU writes. In some embodiments, tenant resource usage data is collected to ensure a required CPU and memory capacity is allocated for a tenant, accommodating for changes in tenant use. In some embodiments, a buffer amount of CPU or memory is allocated to a tenant. In some embodiments, tenant usage resource data comprises information on whether the serviced customer loads data in a compressed or compressed state. In some embodiments, data in a compressed state requires a different service or a different hardware capacity than a data in an uncompressed state.

In 804, a maximum use-case for a time period is determined. In some embodiments, the tenant usage profile comprises a maximum tenant usage case for a time period. In some embodiments, the maximum tenant usage case is used to predict tenant behavior. In some embodiments, the maximum tenant usage case is used in developing the tenant assignment model. For example, a sample week is assembled for the tenant, wherein each day of the sample week comprises the maximum tenant usage case across the past month for the tenant. For example, a tenant used 4 gigabytes of static RAM for an OTS service on the first Monday of April, 10 gigabytes on the second Monday of April, 6 gigabytes on the third Monday of April, and 7 gigabytes on the fourth Monday of April. The sample week accounts for 10 gigabytes of static RAM for an OTS service on Monday. In some embodiments, the tenant usage profile is dynamically updated based on a usage history. For example, the sample week compiled based on the month of April is used for a tenant assignment plan that is executed for the first week of May. For the second week of May, tenant resource usage data from the last three weeks of April and the first week of May are used to assign tenants in the second week of May. In various embodiments, the time period comprises a week, two weeks, two days, or any appropriate period of time. In some embodiments, the creation of a maximum tenant usage case for a time period allows the system to build in a buffer or diminish the impact of rare events. For example, a customer may comprise a company that is on vacation for one week of the month, resulting in low hardware usage. The use of a maximum tenant usage case over a month prevents the anomaly of the low hardware usage from having an effect on the tenant assignment. In some embodiments, the creation of a maximum tenant usage case for a time period diminishes the effect of lost tenant data or unaccounted logs on the tenant assignment.

In some embodiments, the time period used is based on known business processes. For example, a tenant is known to have irregular utilization of computer hardware due to events such as a payroll event, a holiday, or a monthly report; consolidating the maximum use cases for each day over a time period of a month accounts for the majority of the irregularities. In 806, processed tenant data is provided. In some embodiments, the processed tenant data comprises a tenant usage profile. In some embodiments, the tenant usage profile creator creates a tenant usage profile in the service system. In some embodiments, the tenant usage profile creator creates a tenant usage profile for each subsequent tenant in the service system until all tenants have been processed.

Figure 9:
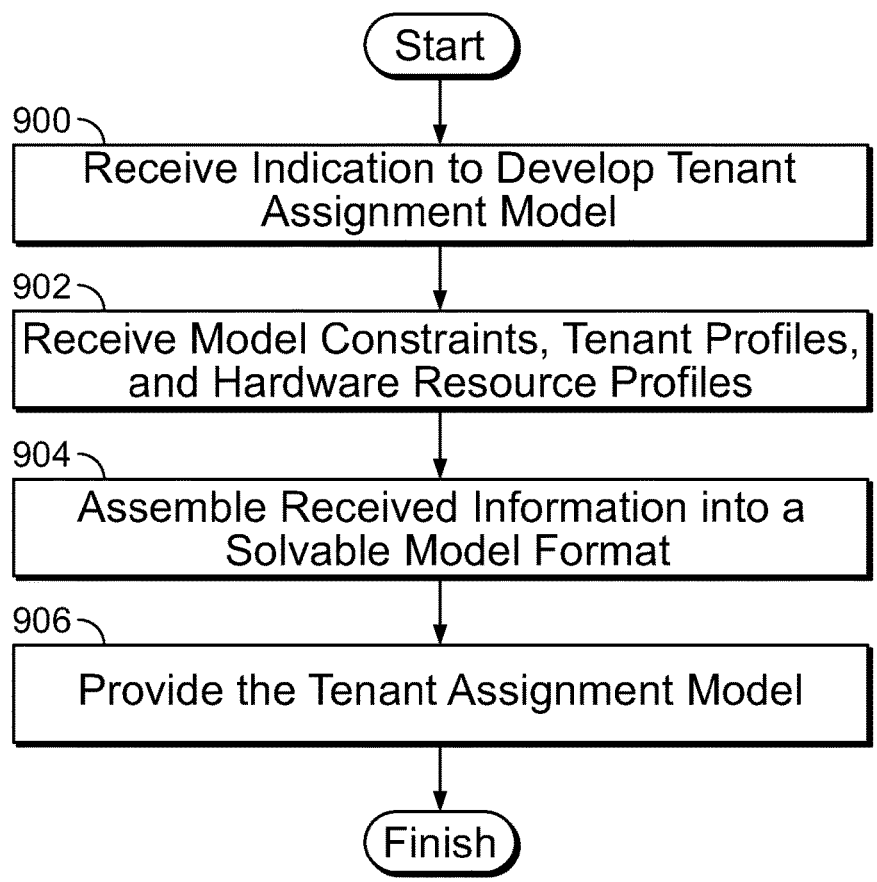
FIG. 9 is a flow diagram illustrating an embodiment of a tenant assignment model developer process.

FIG. 9 is a flow diagram illustrating an embodiment of a tenant assignment model developer process. In some embodiments, the process of FIG. 9 is executed using tenant assignment model developer 404 of FIG. 4. In the example shown, in 900, an indication to develop a tenant assignment model is received. In 902, model constraints, tenant usage profiles, and hardware resource profiles are received.

In some embodiments, the constraint comprises one or more of the following: a preference to move tenants to a specific set of services which are considered preferred by current practices, a penalization for moving tenants without substantial savings, a static resource limit, a dynamic resource limit, a number of tenants assigned to a hardware resource, a specialized service needed, a structural constraint, a buffer, a tenant consumption, a service of all tenants, or any other appropriate constraint. Services in a system may be assigned a numerical index. An administrator may prefer to move tenants to services of lower indices as a method of organization. In various embodiments, model constraints specify a configuration for the hardware resources, model constraints specify that a tenant is allocated only to one server, model constraints specify a minimum or total number of a type of specialized server, or any other appropriate model constraint. In some embodiments, a constraint comprises a hard limit for the number of changes made (e.g., the number of times a tenant is moved from its group to a different group). In some embodiments, a constraint specifies that a customer or client has a maximum of one tenant in a tenant group. In some embodiments, a constraint performs different actions based on a tenant group configuration metadata type. In some embodiments, a constraint forces one or more specific tenants to be on a specific hardware. In some embodiments, a structural constraint comprises a structural element used in the tenant assignment model. For example, a structural constraint specifies that a tenant cannot be assigned to multiple groups.

In 904, received information is assembled into a solvable model format. In some embodiments, the model desired result is a least-cost placing of tenants into tenant groups such that an optimal use of hardware resources is achieved without sacrificing tenant performances. In some embodiments, tenant resource usage data, hardware resource data, and model constraints are used to develop cost functions. In some embodiments, the tenant assignment model comprises a cost function for a service in the set of services. In some embodiments, the main cost drivers are the specialized servers that are used to service requests (e.g. an OTS server, an AOD server, or an ORS server). In some embodiments, data center operational considerations are used to develop the model. In some embodiments, the tenant assignment model comprises a cost function based on RAM and CPU usage. In some embodiments, a cost function is used to limit an undesired event. For example, a cost penalty is applied to limit the number of times a tenant changes groups or to limit a tenant moving to a lower indexed group. In 906, the tenant assignment model is provided.

In mathematics, an index set labels members of another set. In some embodiments, the index sets of the model comprise the following:

T=Set of Tenants
G=Set of Tenant Groups
AS=Set of all services
S=Set of OTS services: $S \subseteq AS$ where service is OTS
A=Set of AOD services: $A \subseteq AS$ where service is AOD
R=Set of ORS Read Only services: $R \subseteq AS$ where service is ORS
P=Time periods
F=Taboo (forbidden together) sets of tenants
C=Single custer sets of tenants
$K^k \subseteq T$: Peak usage of tenants included cause Peak usage overload In some embodiments, the indices of the model comprise the following:
t=specific tenant, t=T
a=specific AOD service, a=A
g=specific tenant group, g=G
s=specific OTS service, s=S
r=specific ORS read only service, ro∈R
p=specific period, p∈P
f=specific set of taboo tenants
c=specific set of customer tenants
k=specific set indicator for Peak usage overloaded set
BNDG=g: boundary group for packLow feature In some embodiments, model data is expressed as zero or positive values (including costs). In some embodiments, the resulting formula has negative numbers for costs allowing for a simpler interpretation of the formula. In some embodiments, the model data comprises the following:

$OTSCST_s \in \mathbb{R}$ =Cost of running a specific OTS
$ORSCST_r \in \mathbb{R}$ =Cost of running a specific ORS instance
$AODCST_a \in \mathbb{R}$ =Cost of running a specific AOD service
$\delta_{CPU} \in \mathbb{R}$, $0 \leq \delta_{CPU} \leq 1$=Buffer multiplier for CPU per configuration
$\delta_{RAM} \in \mathbb{R}$, $0 \leq \delta_{RAM} \leq 1$=Buffer multiplier for RAM per configuration TNT_VAL$_t$∈ℝ =Tenant value
FORBIDDEN$_{tf}$∈ℝ =Amount of forbiddenness for tenant t with taboo set f
FORB_LIMIT$_f$∈ℝ =Limit on amount of forbiddenness allowed with taboo set f
RD_STATIC_MEM$_{tp}$∈ℤ =
Static "read" memory requires for tenant t in bytes in period p
RD_DYNAMIC_MEM$_{tp}$∈ℤ =
Task "read" memory requires for tenant t in bytes in period p
WR_STATIC_MEM$_{tp}$∈ℤ =Write memory requires for tenant t in bytes in period p
WR_DYNAMIC_MEM$_{tp}$∈ℤ
=Task "write" memory requires for tenant t in bytes in period p
AOD_STATIC_MEM$_{tp}$∈ℤ =AOD memory required for tenant t in bytes in period p
AOD_DYNAMIC_MEM$_{tp}$∈$\mathcal{M}$
=AOD memory required for tasks for tenant t in bytes in period p
READ_CPU$_{tp}$∈ℤ =Read requirements for tenant t in CPU seconds in period p
WRITE_CPU$_{tp}$∈ℤ =Write requirements for tenant t in CPU seconds in period p
AOD_CPU$_{tp}$∈ℤ =AOD CPU required for tenant t in CPU seconds in period p
SVCRAM$_{as}$∈ℤ =Service (OTS+ORS) Heap limit in bytes
SVC_CPU_CORES$_{as}$∈ℤ =Cores per service (all services)
NEIGHBORS$_{as}$∈ℤ
=Number of services currently together with this one (all services)
CUSTTEN$_{tc}$={1 if f tenant t belongs to customer c, 0 ow}
a$_{tg}$∈{0,1}=1 if f tenant t was in group g previously
AODUSED$_{ga}$∈{0,1}=1 if f AOD a was assigned to group g previously
MOVE_UP$_{tg}$={0 if f tenant t is currently in group g or g<BNDG, 1 otherwise}
In some embodiments, decision variables of the model comprise the following:
x$_{tg}$∈{0,1}=Assign tenant to tenant group
y$_{gs}$∈{0,1}=Turns on tenant group (OTS) with service s
z$_{gr}$∈{0,1}=Group g assigned ORS r
v$_{ga}$∈{0,1}=Group g assigned AOD a
d$_{tg}$∈{0,1}=indicates when a tenant has changed groups
w$_{tgr}$∈{0,1}=Tenant t is assigned to Group g AND Group g is allocated ORS ro
In some embodiments, constants of the model comprise the following:
$\mathcal{M}$ =A large number (e.g., 100,000)
PEN=Cost penalty for moving a tenant between groups
MAXMOVE=Max number of tenant moves allowed
OTSTHREAD_RDWR_LIMIT=Max number of threads on an OTS (read or write)
OTSTHREAD_WR_LIMIT=Max number of threads on an OTS for writing
ORSTHREADLIMIT=Max number of threads on an ORS
AODTHREADLIMIT=Max number of threads on an AOD
SEC_PER_PER=Number of seconds per period
OLD_PERM_FRACT=Fraction of oldgen and permgen of JVM total ram
GCLIM=Limits the number of full GCs allowed over the horizon
MAXTENANTS=Maximum allowable tenants in one group
TENANTVAL=Value of a tenant
In some embodiments, an objective allocation function maximizes utilization by minimizing cost as calculated by cost functions. In some embodiments, an objective allocation function of the model comprises the following:

$$\text{maximize} - \sum_{GS}(OTSCST_s * y_{gs}) - \sum_{GR} ORSCST_{ro} * z_{gro} - \sum_{GA} AODCST_a * v_{ga} - \sum_{TG} \frac{PEN}{2} * d_{tg} + \sum_{TG} TENANTVAL * x_{tg} - \sum_{TG} MOVEUP_{tg}/2 * TENANTVAL * x_{tg}$$

In some embodiments, a set of constraints implements a logical "Exclusive Or" (XOR) to push d variable values to 1 when a change is made. In some embodiments, any time d is 1 there is a change for that tenant and group, and if d is zero there is no change. In some embodiments, the set of constraints comprise the following:

$$d_{tg} - x_{tg} \leq a_{tg} \forall t \in T, g \in G \quad (1)$$

$$d_{tg} - x_{tg} \geq -a_{tg} \forall t \in T, g \in G \quad (2)$$

$$d_{tg} + x_{tg} \geq a_{tg} \forall t \in T, g \in G \quad (3)$$

$$d_{tg} + x_{tg} \leq 2 - a_{tg} \forall t \in T, g \in G \quad (4)$$

In some embodiments, the truth table below provides an explanation of XOR constraints. For any given tenant and tenant group pair (tg pair) the "a" value indicates that the tenant t is currently assigned to group g. In the table below, the TRUE values in the main part of the table indicate where the constraints listed above are "satisfied" with the specified combinations for values of x, a, and d for each of the four constraints in turn. The net effect of "AND-ing" these four constraints is for the variable "d" to be set to the XOR between "a" and "x" which is desired. This XOR effect result is in the (AND) row in the table. For example, the "(AND)" row is logically AND-ing the 4 constraint's results together for the same combination of x, a, and d.

In some embodiments, an XOR indicates where 2 Boolean (true/false) values do not match. When the tenant to group assignment variable "x" does not match the prior assignment data "a" then the d variable will be set to "TRUE" to indicate that something changed. This set of 4 constraints achieves that behavior.

|  |  |  | x | 0 | 0 | 1 | 1 |
|---|---|---|---|---|---|---|---|
|  |  |  | a | 0 | 1 | 0 | 1 |
| XOR constraint | (1) | d | 0 | TRUE | TRUE | TRUE | TRUE |
|  |  |  | 1 |  | TRUE | TRUE | TRUE |
|  | (2) |  | 0 | TRUE | TRUE |  | TRUE |
|  |  |  | 1 | TRUE | TRUE | TRUE | TRUE |
|  | (3) |  | 0 | TRUE |  | TRUE | TRUE |
|  |  |  | 1 | TRUE | TRUE | TRUE | TRUE |
|  | (4) |  | 0 | TRUE | TRUE | TRUE | TRUE |
|  |  |  | 1 | TRUE | TRUE | TRUE |  |
|  | (AND) |  | 0 | TRUE |  |  | TRUE |
|  |  |  | 1 |  | TRUE | TRUE |  |

In some embodiments, a change penalty is set or a number of allowed changes is limited. In some embodiments, a multiplier of 2 is used because each move will actually cause 2 "d" variable values to go to 1. In some embodiments, the change penalty is covered by the objective allocation function, but the change limit requires a separate function. In some embodiments, a constraint that limits the number of changes comprises the following:

$$\sum_{TG} d_{tg} \leq 2 * MAXMOVE$$

In some embodiments, a constraint that specifies a tenant can only be allocated once comprises the following:

$$\sum_{G} x_{tg} \leq 1 \forall t \in T$$

In some embodiments, services are considered separately from a tenant group. In some embodiments, a constraint that specifies a service can only be used once comprises the following:

$$\sum_{G} y_{gs} \leq 1 \forall s \in S$$

In some embodiments, a constraint that specifies for a specific tenant group, only one service can be chosen comprises the following:

$$\sum_{S} y_{gs} \leq 1 \forall g \in G$$

In some embodiments, the number of a type of specialized server (e.g., a server providing an ORS service) is limited for a tenant group or for the entire system. In some embodiments, a coding option exists to indicate the limit is the number of specialized servers that the current system (e.g., prior to tenant assignment) has. In some embodiments, the constraint comprises the following:

$$\Sigma_R z_{gr} - \Sigma_S ORSPLSZ_g * y_{gs} \leq 0 \forall G$$

In some embodiments, a constraint specifies that a tenant group must be accounted for or turned on for a tenant to be assigned to it. In some embodiments, the constraint comprises the following:

$$\sum_{T} x_{tg} - \sum_{S} MaxTenants * y_{gs} \leq 0 \forall g \in G$$

In some embodiments, service resources are limited by a fraction of the full JVM size and then a buffer multiplier is applied. In some embodiments, a server configured to provide an OTS service has a specific static memory limit that is respected when assigning tenant groups.
In some embodiments, a corresponding constraint comprises the following:

Amount used−service supplied resources<=0

$$\sum_{T} WR\_STATIC\_MEM_{tp} * x_{tg} -$$

$$\sum_{S} \delta^{RAM} * OLD\_PERM\_FRACT * SVCRAM_s * y_{gs} \leq 0 \forall g \in G, p \in P$$

In some embodiments, a limit on the number of full garbage collections over a time period is respected when assigning tenant groups per an OTS service. In some embodiments, a corresponding constraint assumes that when the remaining RAM (full JVM size—static RAM used) fills up a full garbage collection occurs and frees the RAM to be used again. In some embodiments, the constraint assumes that the remaining RAM use is that which can be reclaimed. In some embodiments, the constraint limits how many times that is reclaimed to a GCLIM limit based on the whole time horizon. In some embodiments, the constraint comprises the following:

dynamic memory used−gc lim*amount of leftover ram<=0

$$\sum_{TP} WR\_DYNAMIC\_MEM_{tp} * x_{tg} -$$

$$\sum_{AS} \delta^{RAM} * GGLIM * (1 - OLD\_PERM\_FRACT) * SVCRAM_{as} * y_{gs} \leq 0$$

$$\forall g \in G$$

In some embodiments, a constraint specifies a limit for ORS specific static memory of tenant groups. In some embodiments, a cost exists for the static ram for each ORS created. In some embodiments, the constraint comprises the following:

$$\sum_{TR} RD\_STATIC\_RAM_{tp} * w_{tgr} -$$

$$\sum_{R} \delta^{RAM} * OLD\_PERM\_FRAC * SVCRAM_r * z_{gr} \leq 0 \forall g \in G, p \in P$$

In some embodiments, a constraint specifies a limit for full garbage collections per week per ORS server. In some embodiments, the constraint is similar to the OTS full garbage collection constraint. In some embodiments, the dynamic ram used is shared across all services as it is driven by tasks which are distributed across the ORS servers, and the usage is multiplied by the x variables. In some embodiments, the service availability uses z variables. In some embodiments, an OTS server is considered as part of the constraint because one or more tenants do not require an ORS server and instead run read transactions with an OTS server. In some embodiments, the constraint comprises the following:

$$\sum_{TP} RD\_DYNAMIC\_RAM_{tp} * x_{tg} -$$

$$\sum_{TR} \delta^{RAM} * GCLIM * (1 - OLD\_PERM\_FRACT) * SVCRAM_r * z_{gr} +$$

$$\sum_{TP} WR\_DYNAMIC\_MEM_{tp} * x_{tg} -$$

$$\sum_{AS} \delta^{RAM} * GGLIM * (1 - OLD\_PERM\_FRACT) * SVCRAM_{as} * y_{gs} \leq 0$$

$$\forall g \in G$$

In some embodiments, a constraint specifies a static RAM cost per tenant for an ORS JVM used. In some embodiments, the w variable is bound to 1 when $X_{tg}$ and $Z_{gr}$ are 1. In some embodiments, the constraint taken together with the prior constraint ensure the static RAM is counted for each tenant in a group each time it gets an ORS server. In some embodiments, the constraint comprises the following:

$$x_{tg}+z_{gr}+w_{tgr} \leq 1 \forall t \in T, g \in G, r \in R$$

In some embodiments, a constraint restricts a read task CPU limit. In some embodiments, a read is serviced by an ORS server. In some embodiments, a read is serviced by an OTS server using capacity not used to service writes. In some embodiments, the constraint comprises the following:

$$\sum_t ((READ\_CPU_{tp} + WRITE\_CPU_{tp}) * x_{tg} -$$

$$\sum_R (SEC\_PER\_PER * MIN(ORSTHREADLIMIT,$$

$$SVC\_CPU\_CORES_r/NEIGHBORS_r)) * \delta^{CPU} * z_{gr} -$$

$$\sum_S (SEC\_PER\_PER * MIN(OTSTHREAD\_RDWR\_LIMIT -$$

$$OTSTHREAD\_WR\_LIMIT,$$

$$SVC\_CPU\_CORES_s/NEIGHBORS_s)) *$$

$$\delta^{CPU} * y_{gs} \leq 0 \forall g \in G, p \in P$$

In some embodiments, a constraint restricts a write task CPU limit for an OTS server for a tenant group. In some embodiments, the constraint comprises the following:

$$\sum_t WRIT\_CPU_{tp} * x_{tg} -$$

$$\sum_S \delta^{CPU} * SEC\_PER\_PER * MIN(OTSTHREAD\_WR\_LIMIT,$$

$$SVC\_CPU\_CORES_s/NEIGHBORS_s) * y_{gs} \leq 0 \forall g \in G, p \in P$$

In some embodiments, a constraint specifies a transactional CPU limit for an AOD server for a tenant group. In some embodiments, the constraint comprises the following:

$$\sum_t AOD\_CPU_{tp} * x_{tg} -$$

$$\sum_A \delta^{CPU} * SEC\_PER\_PER * MIN(AODTHREADLIMIT,$$

$$SVC\_CPU\_CORES_a)/NEIGHBORS_a * v_{ga} \leq 0 \forall g \in G, p \in P$$

In some embodiments, a constraint specifies that every tenant must be in a group. In some embodiments, the constraint comprises the following:

$$\sum_G x_{tg} = 1 \forall t \in T$$

In some embodiments, a constraint specifies that the model adhere to a model type. For example, two versions of metadata are used. The constraint binds a tenant group name to a server name in order to adhere to one of the two versions of metadata. In some embodiments, the constraint comprises the following:

$$y_{gs}=0 \forall g \in G, s \in S: g \neq s$$

In some embodiments, the constraint requires another constraint to to ensure the same AOD server is used with the same OTS server. In some embodiments, the constraint comprises the following:

$$v_{ga}=AODUSED_{ga}=g \in G, a \in A: g \neq s$$

In some embodiments, a constraint preserves forced assignments. In some embodiments, the constraint comprises the following:

$$x_{tg}=1 \forall t \in T, g \in G: \text{tenant } t \text{ is pre-assigned to group } g$$

In some embodiments, a constraint specifies forbidden sets. In some embodiments, forbidden sets are a general mechanism for limiting how much of one entity can be included. For example, a forbidden set constraint is used to specify a peak usage of CPU for a tenant in the week. In some embodiments, the constraint comprises the following:

$$\sum_T FORBIDDEN_{tf} * x_{tg} \leq FORB\_LIMIT_f \forall g \in G, f \in F$$

In some embodiments, a constraint prevents more than one tenant from the same customer to be in the same tenant group. In some embodiments, the constraint comprises the following:

$$\sum_T CUSTTEN_{tc} * x_{tg} \leq 1 \forall g \in G, c \in C$$

In some embodiments, a constraint prevents tenants with common peak usage to be in the same tenant group. In some embodiments, the constraint is achieved by counting how many conflicting tenants are in a tenant group and limiting the sum of the included services to the cardinality minus one. For example, a tenant group has 3 tenants that together overload the AOD CPU usage during a 15 minute period during the week. K will have cardinality 3 so the constraint limits only 2 of the 3 can go together at any one time. For each such subset it must be forbidden in every tenant group. In some embodiments, the constraint comprises the following:

$$\{K^k\} \equiv \{t \subseteq T : PeakConflictDetection \text{ indicates overloaded}\} : k \text{ as needed}$$

$$\sum_{t \in K^k} x_{tg} \leq |K| - 1 \forall g \in G, k \text{ as needed}$$

Figure 10:
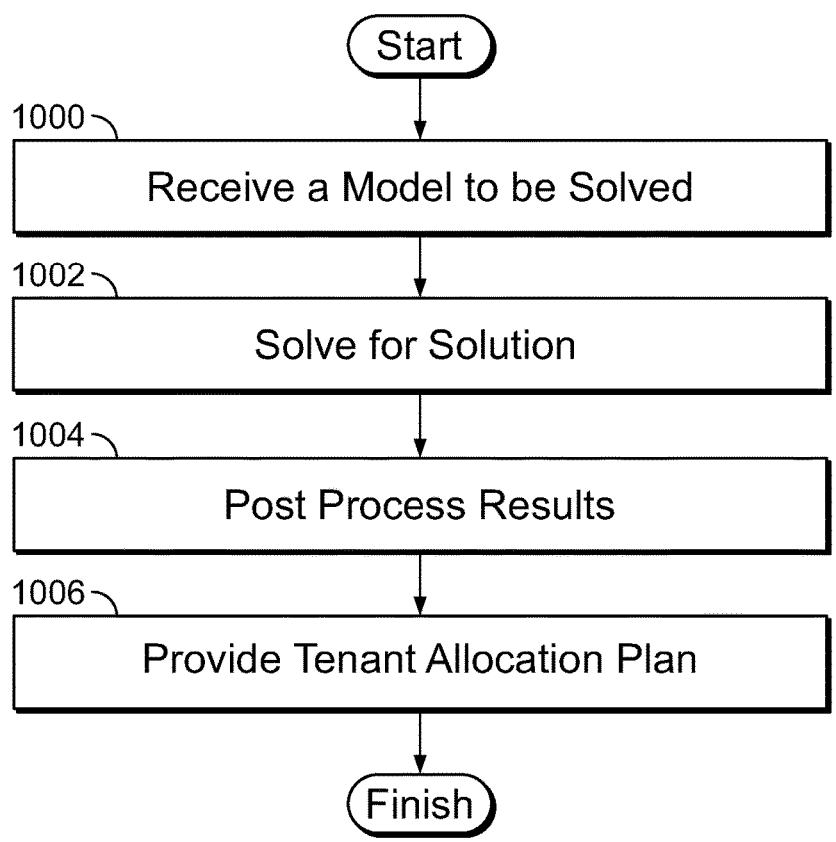
FIG. 10 is a flow diagram illustrating an embodiment of a tenant allocation evaluator process.

FIG. 10 is a flow diagram illustrating an embodiment of a tenant allocation evaluator process. In some embodiments, the process of FIG. 10 is executed using tenant allocation evaluator 406 of FIG. 4. In the example shown, in 1000, a model to be solved is received. In 1002, the solution is solved for. In some embodiments, the solution is solved for by minimizing cost, wherein cost functions in the model are based on hardware resource data, tenant usage resource data, and/or constraints. In some embodiments, the tenant assignment model is caused to be solved by an integer linear program solver. In some embodiments, a math modeling code is used to assemble the model into an integer linear program. In some embodiments, the model is submitted to a computational Infrastructure for Operation Research (COIN-OR) math library to solve the model. In 1004, results are post processed. In some embodiments, the tenant assignment model results are post-processed to determine tenant assignment. In some embodiments, the results are disassembled and interpreted to determine placement of tenants. In 1006, the tenant allocation plan is provided.

Figure 11:
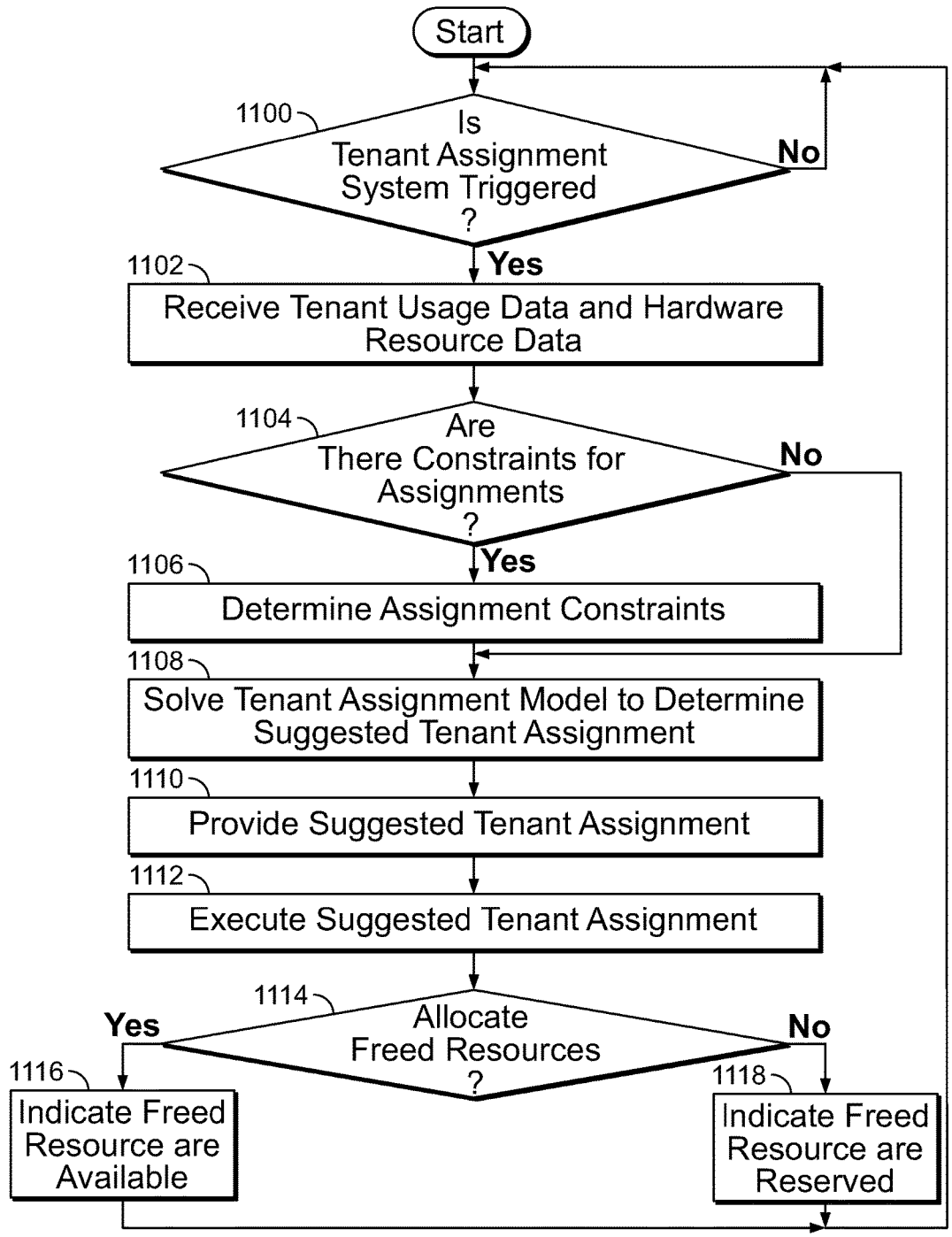
FIG. 11 is a flow diagram illustrating an embodiment of a process for a tenant assignment system.

FIG. 11 is a flow diagram illustrating an embodiment of a process for a tenant assignment system. In some embodiments, the process of FIG. 11 is executed using a tenant assignment system (e.g., tenant assignment system 102 of FIG. 1 or tenant assignment system 400 of FIG. 4). In the example shown, in 1100 it is determined whether the tenant assignment system is triggered. In the event that the tenant assignment system is not triggered, control passes to 1100. In some embodiments, a wait period is instituted before reevaluating 1100. In the event that the tenant assignment system is triggered, then in 1102 tenant resource usage data and hardware resource data is received. For example, the tenant resource usage data comprises tenant information on a set of tenants and the hardware resource data comprises a hardware resource information on a set of hardware resources. In various embodiments, a hardware resource in the set of hardware resources is configured to provide one or more of the following services: Object Transaction Service, an Advanced Objects Data Store Service, an Object Reporting Service, or any other appropriate service. In some embodiments, a hardware resource is configured to comprise one or more specialized servers. In some embodiments, a hardware resource profile comprises a server memory capacity and a server processor capacity. In some embodiments, tenant resource usage data comprises a tenant usage profile. In various embodiments, a tenant usage profile is based at least in part on one or more of the following: a static data footprint of the data, a metadata size, an estimate of RAM growth based on tasks run, a task count, an instance accessed, a number of decompressions, or any other appropriate data. In some embodiments, the tenant resource usage profile is dynamically updated based on a usage history. In various embodiments, a tenant in the set of tenants has a required service, wherein the required service comprises one of the following: an Object Transaction Service, an Advanced Objects Data Store Service, or an Object Reporting Service. In various embodiments, tenant resource usage data comprises one or more of the following: a task log, a garbage collection log, a tenant configuration data, or any other appropriate data. In 1104, it is determined whether there are constraints for the assignments. For example, it is determined whether there is a constraint for assignments comprising one or more of the following: a preference to move tenants to lower numbered services, a penalization for moving tenants without substantial savings, a static resource limit, a dynamic resource limit, a number of tenants assigned to a hardware resource, a specialized service needed, a structural constraint, a buffer, a tenant consumption, a service of all tenants, or any other appropriate constraint. In the event that there are no constraints for assignments, control passes to 1108. In the event that there are constraints for assignments, in 1106 assignment constraints are determined. In 1108, tenant assignment model is solved to determine a suggested tenant assignment. In some embodiments, the suggested tenant assignment allocates a tenant to a hardware resource. In some embodiments, the tenant assignment model comprises a cost function for a service in a set of services. In some embodiments, the tenant assignment model is caused to be solved by an integer linear program solver. In some embodiments, the tenant assignment model results are post-processed to determine tenant assignment. In 1110, the suggested tenant assignment is provided. In 1112, the suggested tenant assignment is executed. For example, the set of tenants is assigned based at least in part on the suggested tenant assignment. In 1114, it is determined whether freed resources are to be allocated. In the event that freed resources are to be allocated, in 1116 it is indicated that freed resources are available. In the event that freed resources are not to be allocated, in 1118 it is indicated that freed resources are reserved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for tenant assignment, comprising:
an interface to:
receive a tenant resource usage data and a hardware resource data,
wherein the tenant resource usage data comprises a tenant information on a set of tenants,
wherein the hardware resource data comprises a hardware resource information on a set of hardware resources; and
a processor to:
create a first tenant usage profile for a first tenant in the set of tenants based at least in part on the tenant resource usage data, wherein the first tenant usage profile comprises a first maximum tenant usage case for a time period, wherein the first maximum tenant usage case for the time period comprises maximum tenant usage by the first tenant of a first recurring time segment and a second recurring time segment over a completed period of time;
create a second tenant usage profile for a second tenant in the set of tenants based at least in part on the tenant resource usage data, wherein the second tenant usage profile comprises a second maximum tenant usage case for the time period, wherein the second maximum tenant usage case for the time period comprises maximum usage by the second tenant of the first recurring time segment and the second recurring time segment over the completed period of time;
develop a tenant assignment model based at least in part on the first maximum tenant usage case, the second maximum tenant usage case, and the hardware resource data;
solve the tenant assignment model to determine a suggested tenant assignment comprising an assignment of the set of tenants to the set of hardware resources, wherein the tenant assignment model is caused to be solved by an integer linear program solver; and
provide the suggested tenant assignment.

2. The system of claim 1, wherein the processor further assigns the set of tenants based at least in part on the suggested tenant assignment.

3. The system of claim 1, wherein a hardware resource in the set of hardware resources is configured to provide one or more of: an Object Transaction Service, an Advanced Objects Data Store Service, or an Object Reporting Service.

4. The system of claim 1, wherein a hardware resource in the set of hardware resources is configured to comprise one or more specialized servers.

5. The system of claim 1, wherein a hardware resource profile is created for a hardware resource in the set of hardware resources.

6. The system of claim 5, wherein the hardware resource profile comprises a server memory capacity and a server processor capacity.

7. The system of claim 1, wherein the first tenant usage profile is based at least in part on one or more of: a static data footprint of the data, a metadata size, an estimate of RAM growth based on tasks run, a task count, an instance accessed, or a number of decompressions.

8. The system of claim 1, wherein the first tenant usage profile is dynamically updated based on a usage history.

9. The system of claim 1, wherein the tenant in the set of tenants has a required service, wherein the required service comprises one of: an Object Transaction Service, an Advanced Objects Data Store Service, or an Object Reporting Service.

10. The system of claim 1, wherein the tenant resource usage data comprises one or more of: a task log, a garbage collection log, or a tenant configuration data.

11. The system of claim 1, wherein the suggested tenant assignment allocates the set of tenants to the set of hardware resources.

12. The system of claim 1, wherein the tenant assignment model comprises a constraint.

13. The system of claim 12, wherein the constraint comprises one or more of: a preference to move tenants to lower numbered services, a static resource limit, a dynamic resource limit, a number of tenants assigned to a hardware resource, a specialized service needed, a structural constraint, a buffer, a tenant consumption, or a service of all tenants.

14. The system of claim 1, wherein the tenant assignment model comprises a cost function for a service in a set of services.

15. The system of claim 1, wherein results for the tenant assignment model results are post-processed to determine tenant assignment.

16. A method for tenant assignment, comprising:
receiving a tenant resource usage data and a hardware resource data,
wherein the tenant resource usage data comprises a tenant information on a set of tenants,
wherein the hardware resource data comprises a hardware resource information on a set of hardware resources;
creating a tenant first tenant usage profile for a first tenant in the set of tenants based at least in part on the tenant resource usage data, wherein the first tenant usage profile comprises a first maximum tenant usage case for a time period, wherein the first maximum tenant usage case for the time period comprises maximum tenant usage by the first tenant of a first recurring time segment and a second recurring time segment over a completed period of time;
creating a second tenant usage profile for a second tenant in the set of tenants based at least in part on the tenant resource usage data, wherein the second tenant usage profile comprises a second maximum tenant usage case for the time period, wherein the second maximum tenant usage case for the time period comprises maximum usage by the second tenant of the first recurring time segment and the second recurring time segment over the completed period of time;
developing, using a processor, a tenant assignment model based at least in part on the first maximum tenant usage case, the second maximum tenant usage case, and the hardware resource data;
solving the tenant assignment model to determine a suggested tenant assignment comprising an assignment of the set of tenants to the set of hardware resources, wherein the tenant assignment model is caused to be solved by an integer linear program solver; and
providing the suggested tenant assignment.

17. A computer program product for tenant assignment, the computer program product being embodied in a non-transitory computer readable storage medium and comprising computer instructions for:
receiving a tenant resource usage data and a hardware resource data,
wherein the tenant resource usage data comprises a tenant information on a set of tenants,
wherein the hardware resource data comprises a hardware resource information on a set of hardware resources;
creating a first tenant usage profile for a first tenant in the set of tenants based at least in part on the tenant resource usage data, wherein the first tenant usage profile comprises a first maximum tenant usage case for a time period, wherein the first maximum tenant usage case for the time period comprises maximum tenant usage by the first tenant of a first recurring time segment and a second recurring time segment over a completed period of time;
creating a second tenant usage profile for a second tenant in the set of tenants based at least in part on the tenant resource usage data, wherein the second tenant usage profile comprises a second maximum tenant usage case for the time period, wherein the second maximum tenant usage case for the time period comprises maximum usage by the second tenant of the first recurring time segment and the second recurring time segment over the completed period of time;
developing, using a processor, a tenant assignment model based at least in part on the first maximum tenant usage case, the second maximum tenant usage case, and the hardware resource data;
solving the tenant assignment model to determine a suggested tenant assignment comprising an assignment of the set of tenants to the set of hardware resources, wherein the tenant assignment model is caused to be solved by an integer linear program solver; and
providing the suggested tenant assignment.

18. The system of claim 12, wherein the constraint comprises a penalization for moving a tenant of the set of tenants from a first hardware resource of the set of hardware resources to a second hardware resource of the set of hardware resources.

* * * * *

UNITED STATES PATENT AND TRADEMARK OFFICE
CERTIFICATE OF CORRECTION

PATENT NO. : 10,313,261 B1
APPLICATION NO. : 15/183668
DATED : June 4, 2019
INVENTOR(S) : Harry Philip Walton, III It is certified that error appears in the above-identified patent and that said Letters Patent is hereby corrected as shown below:

In the Specification

In Column 10, Line 46, delete "t≡T" and insert --t ∈ T--, therefor.
In Column 10, Line 47, delete "a≡A" and insert --a ∈ A--, therefor.
In Column 10, Line 48, delete "g≡G" and insert --g ∈ G--, therefor.
In Column 10, Line 49, delete "s≡S" and insert --s ∈ S--, therefor.
In Column 11, Line 19, after "∈", delete "M" and insert --Z--, therefor.
In Column 11, Line 33, delete "if f" and insert --iff--, therefor.
In Column 11, Line 34, delete "if f" and insert --iff--, therefor.
In Column 11, Line 35, delete "if f" and insert --iff--, therefor.
In Column 11, Line 37, delete "if f" and insert --iff--, therefor.
In Column 14, Line 60, delete "GGLIM" and insert --GCLIM--, therefor.
In Column 15, Line 34, delete "WRIT" and insert --WRITE--, therefor.
In Column 16, Line 7, before "g ∈ G" delete "=" and insert --∀--, therefor.

In the Claims

In Column 19, Line 38, Claim 15, after "model" delete "results".

Signed and Sealed this
Eighteenth Day of February, 2020

Andrei Iancu
*Director of the United States Patent and Trademark Office*